United States Patent
Lee et al.

(10) Patent No.: US 9,436,230 B2
(45) Date of Patent: Sep. 6, 2016

(54) DYNAMIC MOVEABLE HINGE

(71) Applicant: LENOVO (SINGAPORE) PTE. LTD., Singapore (SG)

(72) Inventors: Chin Kai Lee, Tokyo (JP); Akinori Uchino, Yokohama (JP); Takuroh Kamimura, Kawasaki (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 93 days.

(21) Appl. No.: 14/330,807

(22) Filed: Jul. 14, 2014

(65) Prior Publication Data

US 2016/0011631 A1    Jan. 14, 2016

(51) Int. Cl.
   *G06F 1/16*    (2006.01)
(52) U.S. Cl.
   CPC .................................. *G06F 1/1681* (2013.01)
(58) Field of Classification Search
   CPC ..................................................... G06F 1/1681
   USPC .......................... 361/679.01, 679.08, 679.09
   See application file for complete search history.

(56) References Cited

U.S. PATENT DOCUMENTS

| 5,734,548 | A | * | 3/1998 | Park | G06F 1/1664 361/679.14 |
| 6,053,589 | A | * | 4/2000 | Lin | G06F 1/166 312/271 |
| 7,239,504 | B2 | | 7/2007 | Schlesener et al. | |
| 2011/0122553 | A1 | * | 5/2011 | Griffin | H04M 1/0216 361/679.01 |

FOREIGN PATENT DOCUMENTS

JP    2012-185663    9/2012

* cited by examiner

*Primary Examiner* — Tuan T Dinh
*Assistant Examiner* — Rockshana Chowdhury
(74) *Attorney, Agent, or Firm* — Shimokaji IP

(57) ABSTRACT

A hinge which may be used for example in portable electronic devices may raise the upper body of the device from the lower body in response to rotation of the upper body about the hinge. The need to include a half-pipe section on the upper surface of the lower body maybe avoided. Thus more internal space of the lower body may be used without having to accommodate for the hinge. In an exemplary embodiment, the hinge may include a cam surface. The cam surface may be configured to shift a longitudinal axis of the hinge on response to the rotation of the upper body. In some embodiments, the shift of the longitudinal axis may be away from the lower body allowing a rear edge of the upper body to move across a rear edge of an upper surface of the lower body.

19 Claims, 5 Drawing Sheets

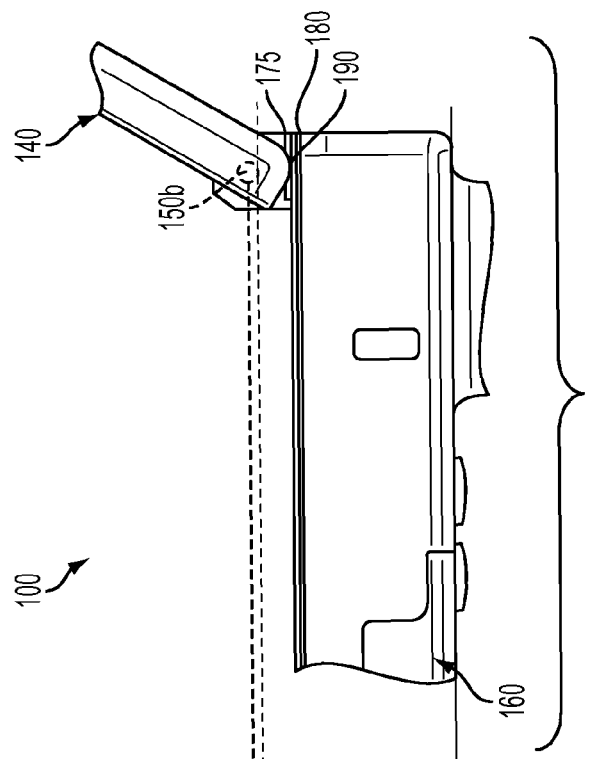
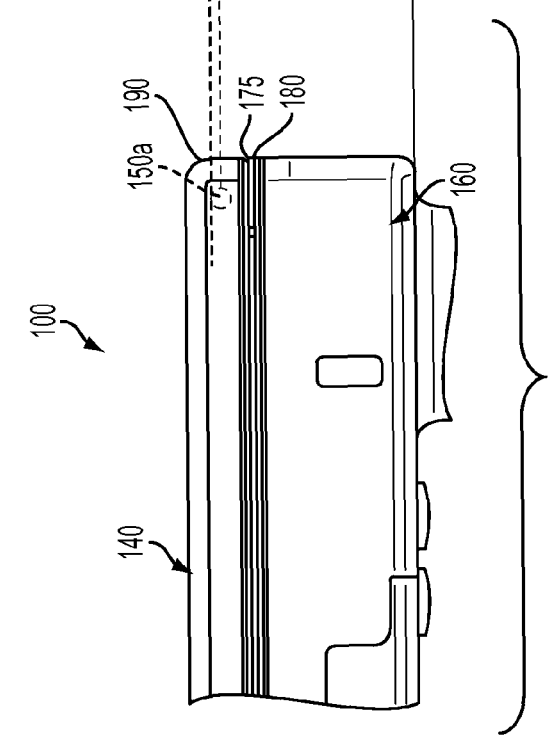

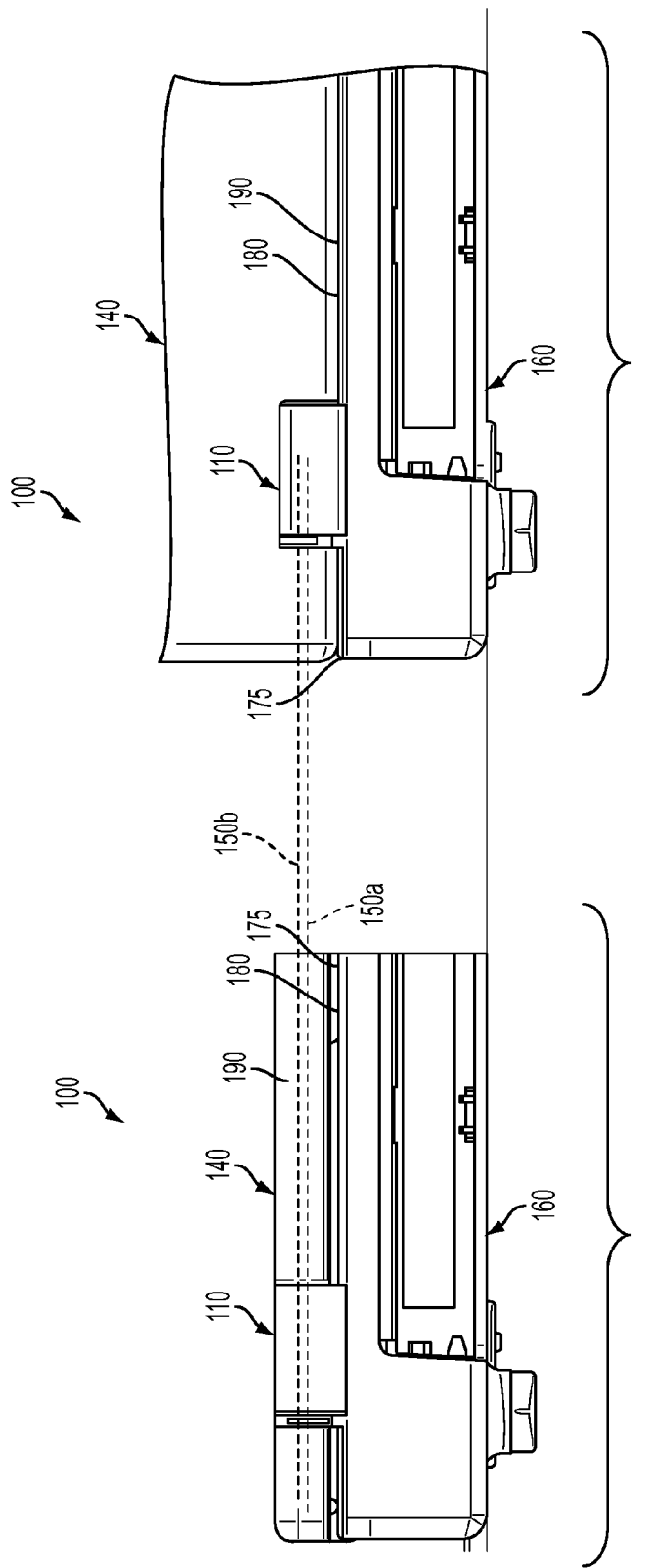

DYNAMIC MOVEABLE HINGE

BACKGROUND OF THE INVENTION

The present invention generally relates to portable electronic devices and, more particularly, to a dynamic moveable hinge for devices such as portable electronic devices.

It is known to include hinges on a portable electronic device. A conventional hinge may enable half of the device to close onto the other half of the device. For example, in laptop computers, a display half of the laptop may be closed onto the computing half of the laptop thus protecting the interiors of each half from external damage.

Referring to FIG. 1, an example of a conventional hinge HN connecting a top half TH to a bottom half BH of a portable electronic device PED is shown. Typically, the hinge HN may connect the rear edges of the device's two halves (TH, BH). The portable electronic device PED may be opened or closed by rotating the top half TH about the hinge's longitudinal axis LA while the bottom half BH generally remains in place. To accommodate the hinge HN during rotation of the top half TH about the hinge's longitudinal axis LA, the bottom half BH may include a half-pipe HP providing clearance for the rear edge RE of the top half TH. The hinge HN may be fixed in place so that the longitudinal axis LA remains static when the top half TH is opened or closed.

In the prior art portable electronic device PED, inclusion of the half-pipe HP may be acceptable when the bottom half BH is sufficiently thick and the protrusion of the half-pipe HP into the interior of the bottom half does not interfere with internal components. However, some portable electronic devices may now be designed with a thinner profile than the prior art portable electronic device PED. In portable electronic devices with a thinner profile, space may be at a premium. In addition, the prior art hinges may undesirably protrude from the rear of a portable electronic device which may contrast sharply with an aesthetic design of portable electronic devices with thinner profiles.

As can be seen, there is a need for a hinge that can connect two halves of a portable electronic device without protruding into the interior of the bottom half of the device.

SUMMARY OF THE INVENTION

In one aspect of the present invention, a hinge comprises a hinge body; and a cam configured to shift a longitudinal axis of the hinge in response to movement of the hinge body.

In another aspect of the present invention, a portable electronic device comprises an upper device body; a lower device body; and a hinge connecting the upper device body to the lower device body, the hinge configured to move the upper device body relative to the lower device body in response to rotation of the upper device body about the hinge.

In another aspect of the present invention, a computing system comprises an upper device body; a lower device body; a hinge connecting the upper body to the lower device body; and a cam surface of the hinge disposed to contact a portion of the lower device body in response to rotation of the cover from a first position to a second position, wherein a horizontal axis of the hinge moves relative to the lower device body.

These and other features, aspects and advantages of the present invention will become better understood with reference to the following drawings, description and claims.

BRIEF DESCRIPTION OF THE DRAWINGS

FIGS. 4A and 4B show end views of the portable electronic device of FIG. 2 in open and closed states; and FIGS. 5A and 5B show rear views of the portable electronic device shown in FIGS. 4A and 4B.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Exemplary embodiments of the present invention generally provide a moveable hinge. The hinge may move during the opening or closing of a device so that the device does not need to include additional clearance for rotation of the hinge. The hinge may be useful in portable electronic devices which may include one half being closable over the other half.

Figure 1:
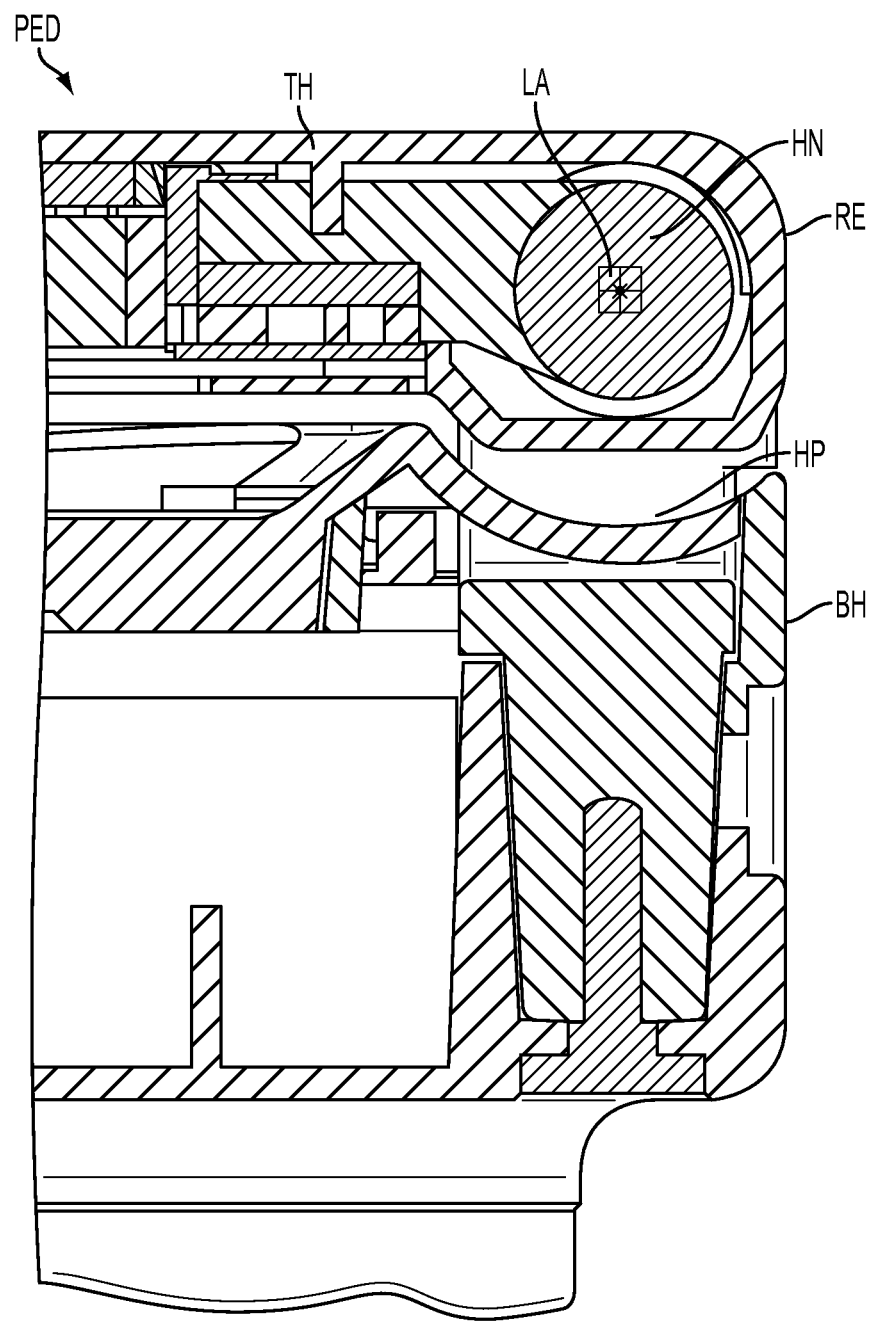
FIG. 1 is a cross-sectional view of a conventional hinge in a computing device.
Figure 2:
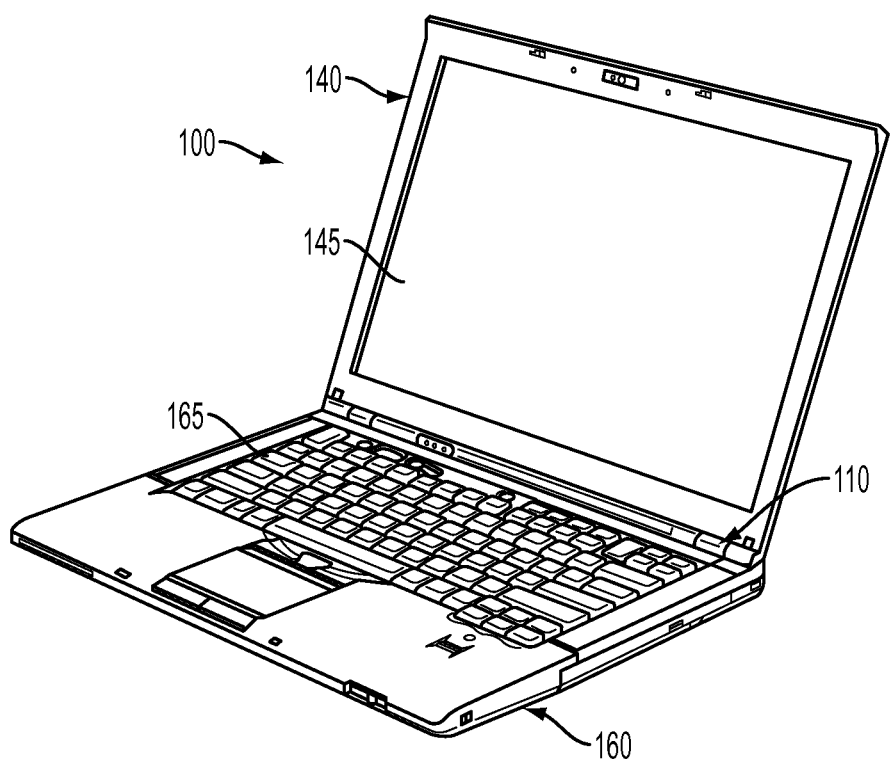
FIG. 2 is a perspective front view of a portable electronic device in accordance with an exemplary embodiment of the present invention.

Referring now to FIG. 2, a portable electronic device 100 (referred to generally as the device 100) is shown according to an exemplary embodiment of the present invention. A hinge 110 may connect an upper device body 140 to a lower device body 160. The upper device body 140 may include a display 145. The lower device body 160 may include an input device 165 (for example, a keyboard). The device 100 may be a computing system, for example, a laptop, a notebook, a sub-notebook, a mobile telephone, a personal gaming device, or other computing device with the upper device body 140 closeable onto the lower device body 160.

Figure 3:
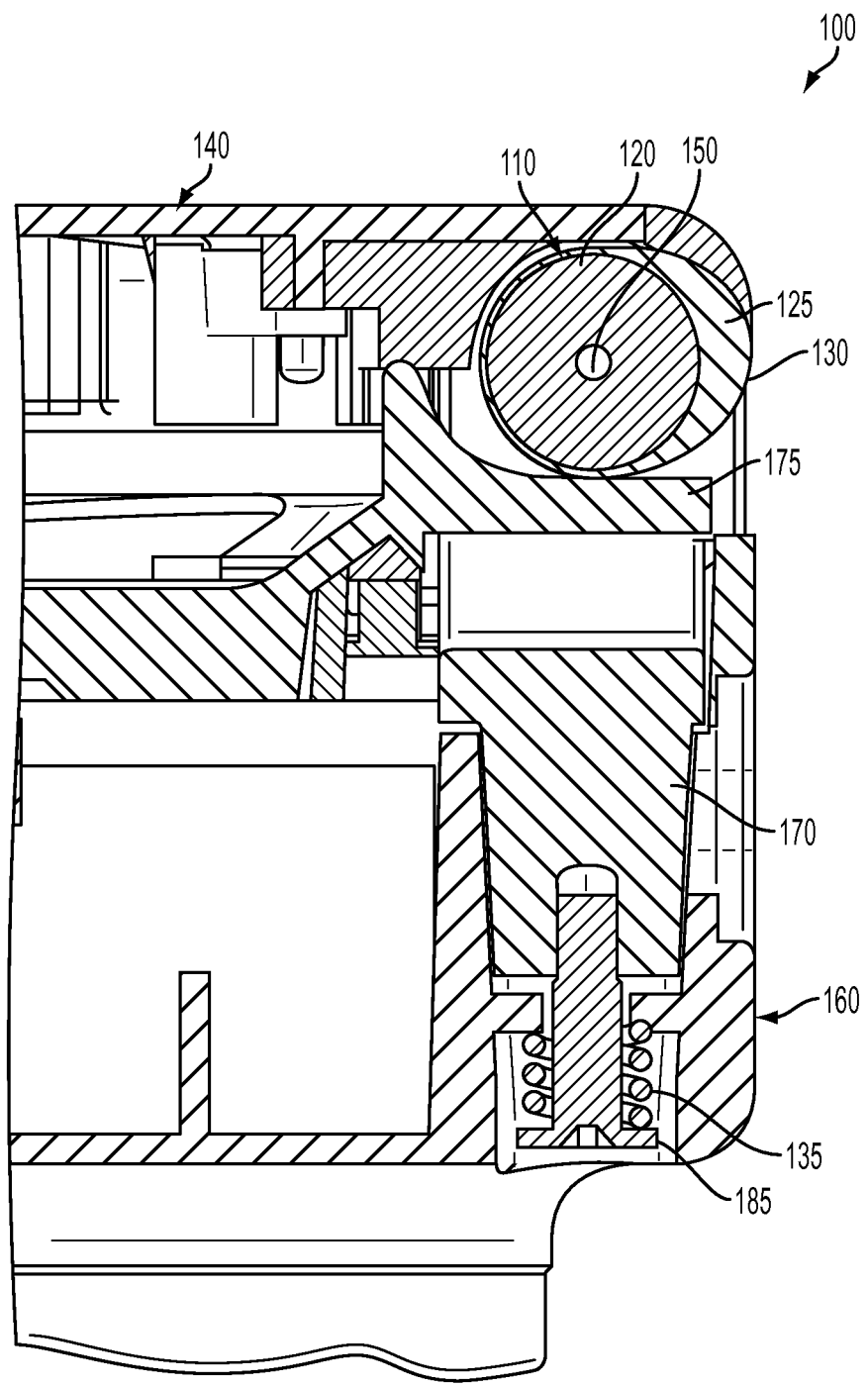
FIG. 3 is a cross-sectional end view of a hinge in the portable electronic device of FIG. 2 in accordance with an exemplary embodiment of the present invention.

Referring now to FIG. 3, a cross-sectional end view of the hinge 110 connecting the upper device body 140 to the lower device body 160 is shown according to an exemplary embodiment of the present invention. The hinge 110 may include a hinge body 120. The hinge body 120 may be a barrel type hinge. The hinge body 120 may rotate about a longitudinal axis 150 (sometimes referred to as a "horizontal axis"). The hinge 110 may move the upper device body 140 relative to the lower device body 160 in response to rotation of the upper device body 140 about the hinge 110. For example, when the device 100 is on a table (not shown), opening the upper device body 140 may raise the longitudinal axis 150 away from the lower device body 160. In an exemplary embodiment, the hinge 110 may include a cam 125. The cam 125 may be an eccentric type cam. The cam 125 may include an oval cam exterior surface 130. The cam 125 may shift the longitudinal axis 150 of the hinge 110 from a default first position to a second position and vice versa in response to movement of the hinge body 120 as explained below.

The lower device body 160 may include a connection portion 170 connecting the hinge 110 to the lower device body 160. The connection portion 170 may include a flat upper surface 175 disposed to oppose contact by the cam exterior surface 130 during rotation of the hinge 110. For example, as the cam exterior surface 130 contacts the flat upper surface 175, the flat upper surface 175 may stay in place while the cam action of the cam 125 drives the hinge body 120 away from the flat upper surface 175. A distance between the longitudinal axis 150 to the cam exterior surface 130 may be variable, when measured as the hinge 110 rotates. Thus, as the upper device body 140 is rotated into an open position, the cam exterior surface 130 may contact the surface 175. Rotation of the cam 125 may shift the longitudinal axis 150 away from the surface 175.

A counter force may be provided by a spring 135 coupled to the connection portion 170. The spring 135 may be attached to a screw 185 coupling the connection portion 170 to the lower device body 160. The spring 135 may bias the connection portion 170 away from the upper device body 140. Upon rotation of the upper device body 140, the connection portion 170 may be pulled by the spring 135 as the longitudinal axis 150 of the hinge 110 may be shifted away from the lower device body 160 by the cam 125. As the upper device body 140 is returned to a closed position, the spring 135 may help shift the longitudinal axis 150 of the hinge 110 back into a default position.

Referring to FIGS. 4A, 4B, 5A, and 5B, the device 100 is shown in a closed state (as depicted on the left side of the figures) side by side with an open state (as depicted on the right side of the figures) of the device 100. The position of the longitudinal axis 150 in the closed state is represented by the numeral 150a. In the open state, the position of the longitudinal axis 150 is represented by the numeral 150b. As shown, the position of the longitudinal axis 150a of the hinge 110 in the closed state may be compared to the position of the longitudinal axis 150b of the hinge 110 in the opened state. In the open state, the position of the longitudinal axis 150b may different than the position of the longitudinal axis 150a. For example, the position of the longitudinal axis 150b may be farther away from the surface 175 than the position of the longitudinal axis 150a. As the upper device body 140 is rotated from the closed position to the open position, the hinge 110 (FIG. 5) may raise the longitudinal axis 150 away from the upper surface 175. A rear edge 190 of the upper device body 140 may move unobstructed across a rear edge 180 of the upper surface 175 of the lower device body 160.

As may be appreciated, exemplary embodiments of the hinge 110 may eliminate the need to provide additional clearance to accommodate the rear edge 190 when the upper device body 140 is rotated open. Computing components (not shown) may occupy the interior space of the lower device body 160 normally used by the half-pipe shaped clearance of the prior art. Thus, the volume needed to house components in the device 100 may be decreased providing for a thinner device 100 profile.

It should be understood, of course, that the foregoing relates to exemplary embodiments of the invention and that modifications may be made without departing from the spirit and scope of the invention as set forth in the following claims.

What is claimed is:

1. A device, comprising:
a first device body;
a second device body;
a hinge comprising a hinge body configured to rotate about a longitudinal axis of the hinge, wherein the hinge connects the first device body to the second device body, and wherein the hinge is configured to move the second device body relative to the first device body in response to rotation of the second device body about the hinge;
a connection portion in the first device body connecting the hinge to the first device body, the connection portion including a flat upper surface of the connection portion;
a cam within the hinge, the cam configured to shift the longitudinal axis of the hinge in response to movement of the hinge body, wherein the flat upper surface of the connection portion is disposed to oppose contact by the cam during rotation of the hinge, wherein rotation of the second device body relative to the first device body drives the hinge body away from the flat upper surface of the connection portion increasing a distance between the longitudinal axis of the hinge and the flat upper surface of the connection portion, while the flat upper surface of the connection portion remains in place relative to the first device body.

2. The device of claim 1, wherein the hinge body is a barrel.

3. The device of claim 1, wherein the cam includes an oval exterior surface.

4. The device of claim 1, wherein the first device body is a lower body of an electronic device and comprises a keyboard, and wherein the second device body is an upper body of the electronic device and comprises a display.

5. The device of claim 1, wherein the cam is an eccentric type cam.

6. A portable electronic device, comprising:
an upper device body;
a lower device body;
a flat upper surface in the lower device body;
a hinge connecting the upper device body to the lower device body, the hinge configured to move the upper device body relative to the lower device body in response to rotation of the upper device body about a longitudinal axis of the hinge;
a connection portion in the lower device body connecting the hinge to the lower device body, the connection portion including a flat upper surface of the connection portion; and
a cam within the hinge, wherein the flat upper surface in the lower device body is disposed to opposed contact by the cam during rotation of the hinge and to shift the longitudinal axis of the hinge away from the lower device body in response to movement of the upper device body relative to the lower device body, increasing a distance between the longitudinal axis of the hinge and the flat upper surface, providing clearance for the rotation of the upper device body, and wherein the lower device body includes an input device.

7. The portable electronic device of claim 6, further comprising a connection portion in the lower device body connecting the hinge to the lower device body, the connection portion including the flat upper surface, wherein the flat upper surface is disposed to oppose contact by a surface of the cam during rotation of the hinge, wherein rotation of the hinge raises the longitudinal axis of the hinge with respect to the lower device body.

8. The portable electronic device of claim 6, wherein the upper device body includes a display.

9. The portable electronic device of claim 8, wherein the lower device body includes a keyboard.

10. The portable electronic device of claim 6, wherein the hinge is a barrel-type hinge.

11. The portable electronic device of claim 6, wherein the rotation of the upper device body comprises opening the upper device body from a closed position with the lower device body.

12. A computing system, comprising:
- an upper device body comprising a cover, the cover including a rear edge of the cover;
- a lower device body;
- a hinge connecting the upper device body to the lower device body;
- a connection portion in the lower device body connecting the hinge to the lower device body, the connection portion including a flat upper surface of the connection portion; and
- a cam surface of the hinge disposed to contact the flat upper surface portion of the lower device body in response to rotation of the cover about a longitudinal axis of the hinge from a closed position to an open position, wherein a the longitudinal axis of the hinge is raised relative to the lower device body, thereby increasing a distance between the longitudinal axis and the flat upper surface portion in response to rotation of the cover to the open position, while the flat upper surface portion of the lower device body contacted by the cam surface of the hinge remains in place with respect to the lower device body.

13. The computing system of claim 12, wherein the lower device body includes an input device.

14. The computing system of claim 13, further comprising a spring coupled to the upper device body.

15. The computing system of claim 14, wherein the spring is configured to provide a counter force to the cam surface in response to rotation of the cover from the first position into the second position.

16. The computing system of claim 15, wherein the spring is configured to shift the longitudinal axis of the hinge from the open position to the closed position in response to rotation of the cover from the open position to a the closed position.

17. The computing system of claim 12, wherein the rear edge of cover is disposed to move across a rear edge of an upper surface of the lower device body in response to the rotation of the cover from the first position into the second position.

18. The computing system of claim 12, wherein the lower device body includes a keyboard.

19. The computing system of claim 18, wherein the upper device body includes a display.

* * * * *